United States Patent
Chen et al.

(10) Patent No.: US 7,079,382 B2
(45) Date of Patent: Jul. 18, 2006

(54) MOUNTING MECHANISM FOR STORAGE DEVICE

(75) Inventors: Yun-Lung Chen, Tu-Cheng (TW); Ling-Lai Wang, Shenzhen (CN)

(73) Assignee: HON HAI Precision Industry Co., Ltd., Tu-cheng (TW)

( * ) Notice: Subject to any disclaimer, the term of this patent is extended or adjusted under 35 U.S.C. 154(b) by 0 days.

(21) Appl. No.: 10/977,970

(22) Filed: Oct. 29, 2004

(65) Prior Publication Data

US 2005/0185372 A1    Aug. 25, 2005

(30) Foreign Application Priority Data

Feb. 20, 2004    (TW) .............................. 93202459 U

(51) Int. Cl.
*G06F 1/16*    (2006.01)

(52) U.S. Cl. ................ 361/685; 312/223.6; 248/298.1; 360/137

(58) Field of Classification Search ............. 360/97.01, 360/98.01, 137, 137 D; 312/223.1–223.6; 248/298.1, 222.4; 361/679–687, 724–727
See application file for complete search history.

(56) References Cited

U.S. PATENT DOCUMENTS

| 5,349,483 | A | 9/1994 | Tsai et al. ................. 360/97.01 |
| 6,388,876 | B1 | 5/2002 | Chen ........................... 361/685 |
| 6,469,890 | B1 | 10/2002 | Gan ............................ 361/685 |
| 6,853,549 | B1 * | 2/2005 | Xu .............................. 361/685 |
| 2004/0047122 | A1 * | 3/2004 | Chen et al. ................. 361/685 |

FOREIGN PATENT DOCUMENTS

TW    482307    4/2002

* cited by examiner

*Primary Examiner*—Hung Van Duong
(74) *Attorney, Agent, or Firm*—Tim Tingkang Xia, Esq.; Morris, Manning & Marti

(57) ABSTRACT

A mounting mechanism includes a computer chassis (90), a bracket (10) defining a pair of slideways (14, 16) in a sidewall (11) thereof for receiving corresponding sliding members (44) of a storage device (40), a power supply (80) rotatably attached in the computer chassis, and a hook (60, 60') pivotally attached to the sidewall of the bracket. The hook is for retaining the sliding members of the storage device in the slideways of the bracket. The power supply is rotated to engage the bracket and the hook thereby securing the storage device in the bracket.

20 Claims, 7 Drawing Sheets

MOUNTING MECHANISM FOR STORAGE DEVICE

BACKGROUND OF THE INVENTION

1. Field of the Invention

The present invention relates to a mounting mechanism for storage device, and more particularly to a mounting mechanism which facilitates attachment of a storage device to a computer chassis.

2. Description of the Related Art

Computers have been widely used in modern life. It is desirable for a user or technician to conveniently access internal devices such as storage devices, expansion cards and Motherboard for purpose of service. However, storage devices, such as hard disk drives, compact disk read-only memory (CD-ROM) drives, digital video disc (DVD) drives, floppy disk drives, and the like are typically secured in computer chassis with screws or bolts. It is complicated and time-consuming to manipulate screws.

As disclosed in U.S. Pat. No. 5,349,483, a hard disk drive is firstly attached to a sliding box with screws, and the sliding box is inserted in a chamber on a computer chassis and releasably locked in place through tenon-and-mortise joints. It is boring to manipulate screws to detach the hard disk drive from the box when in need.

Taiwan Patent Application No. 89212419 teaches another hard disk drive mounting device. A mounting device included a support bracket and a securing plate. The hard disk drive is fixed to the support bracket with screws. The support bracket has a body with spring fingers for engaging computer chassis, and the securing plate has a base for engaging with the body of the support bracket. The securing plate includes a spring portion extending from one edge of the base for engaging the computer chassis, and a pulling portion with a slot defined therein extending from the opposite edge of the base. In spite of unduly complicated fixing structure, it is desired to reduce the use of screws.

SUMMARY OF THE INVENTION

Accordingly, an object of the present invention is to provide a mounting mechanism which facilitates the attachment of a storage device to a computer chassis.

Another object of the present invention is to provide a mounting mechanism which can simultaneously secure two internal devices to a computer chassis without use of screws.

To achieve the above objects, a mounting mechanism in accordance with the present invention comprises a computer chassis, a bracket defining a pair of slideways in a sidewall thereof for receiving corresponding sliding members of a storage device, a power supply rotatably attached in the computer chassis, and a hook pivotally attached to the sidewall of the bracket. The hook is for retaining the sliding members of the storage device in the slideways of the bracket. The power supply is rotated to engage the bracket and the hook thereby securing the storage device in the bracket.

Other objects, advantages and novel features of the present invention will be drawn from the following detailed description of preferred embodiments of the present invention with the attached drawings, in which:

DETAILED DESCRIPTION OF THE PRESENT INVENTION

Figure 1:
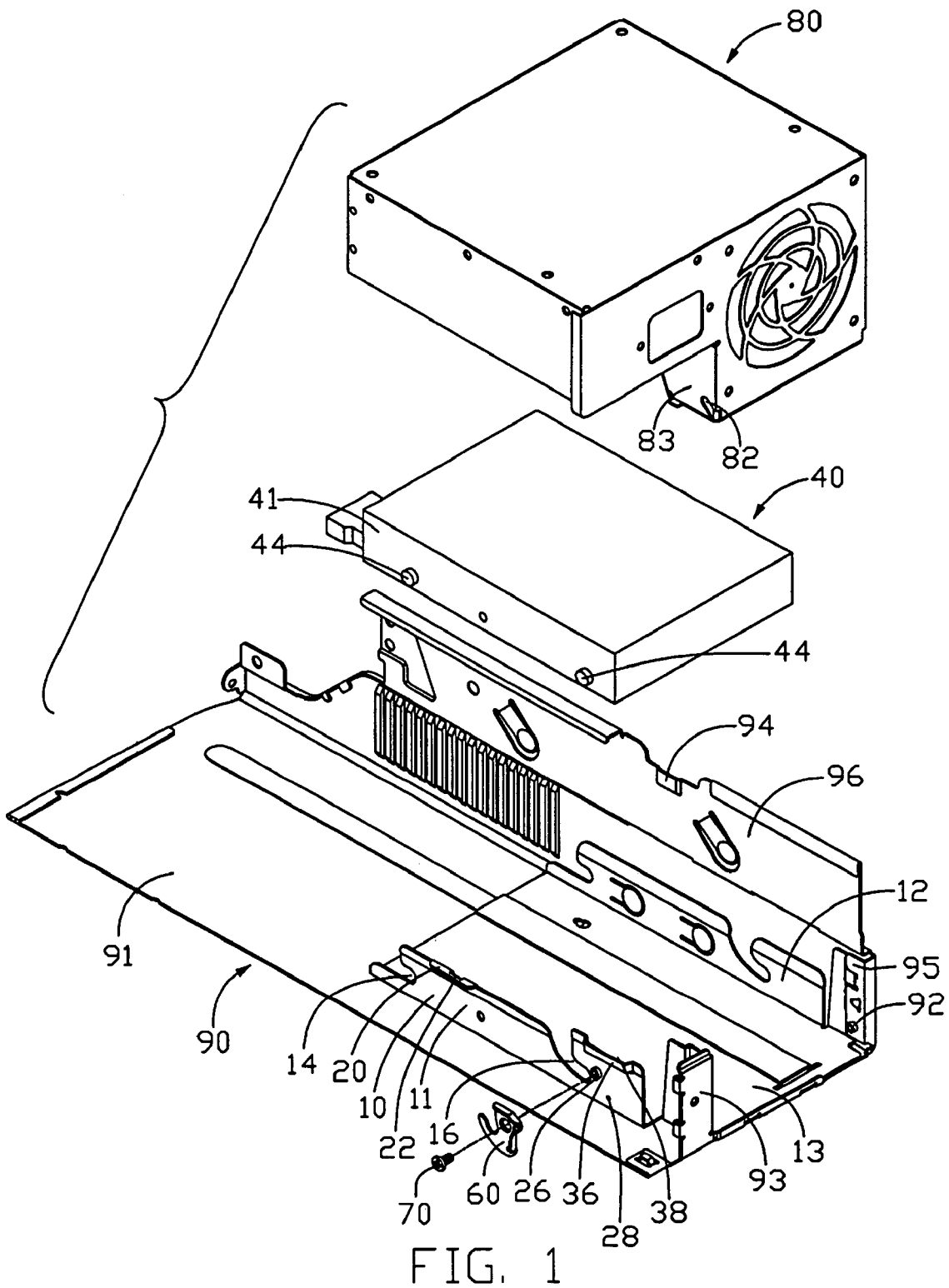
FIG. 1 is an exploded, isometric view of a mounting mechanism in accordance with a preferred embodiment of the present invention together with a storage device, the mounting mechanism comprising a computer chassis, a bracket, a hook and a power supply.

Referring to FIG. 1, a mounting mechanism in accordance with the preferred embodiment of the present invention is provided for holding a storage device 40 in place. The mounting mechanism comprises a bracket 10 attached to a computer chassis 90, a hook 60 as a securing member and an internal device such as a power supply 80.

The computer chassis 90 comprises a first wall 91 and a second wall 96 perpendicularly extended from a longitudinal edge of the first wall 91. A bent plate 93 is formed from a rear end of the first wall 91. A bent plate 95 is bent forwardly from a rear edge of the second wall 96. A pivot 92 is formed on a side face of the second wall 96 at a lower rear portion thereof. Another pivot (not visible) is formed on a side face of the bent plate 93, corresponding to the pivot 92 of the second wall 96. A groove 94 is stamped inwardly adjoining a cutout at upper portion of the second wall 96.

The bracket 10 comprises a pair of sidewalls 11, 12, and a bottom wall 13 supported on the first wall 91 of the computer chassis 90. The bottom wall 13 connects between the sidewalls 11, 12. A horizontal slideway 14 is defined in a front end of each of the sidewalls 11, 12. An arcuate slideway 16 is defined in each of the sidewalls 11, 12 adjacent to a rear end thereof. A flange 20 is bent outwardly from an upper edge of the sidewall 11 adjacent to the slideway 14. A slot 22 is defined in the flange 20. A barrier strip 36 is stamped outwardly from the upper edge of the sidewall 11 proximal to the rear end, thereby defining an opening 38 between the barrier strip 36 and the sidewall 11. A protrusion 26 is formed adjacent to a terminal end of the slideway 16 of the sidewall 11. The protrusion 26 defines a threaded hole therein. A convex 28 is formed on the sidewall 11 at a lower and rear position relative to the protrusion 26.

The storage device 40 comprises a pair of sliding members 44 attached to each of opposite sidewalls 41, corresponding to the slideways 14, 16 of the bracket 10.

Figure 3:
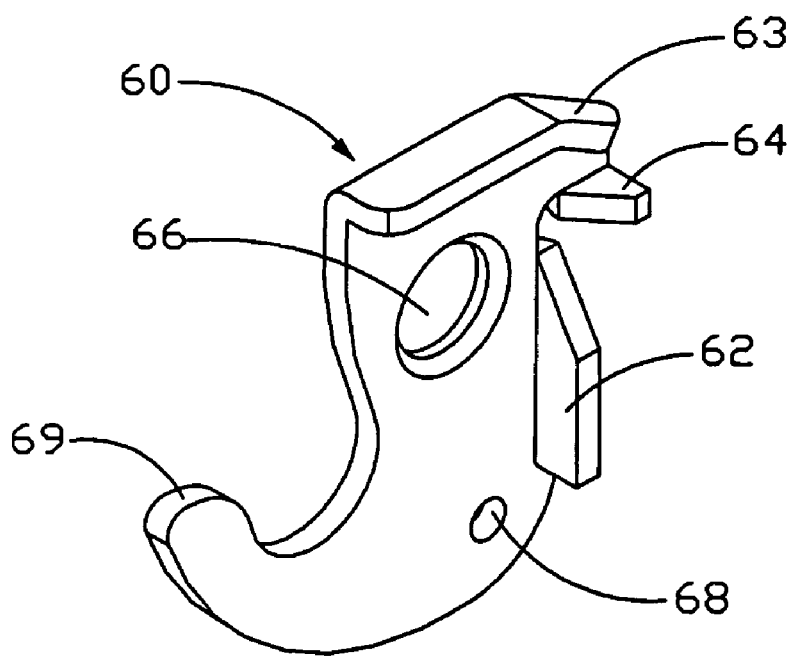
FIG. 3 is an enlarged view of the hook shown in FIG. 1, but viewed from another aspect.

Referring to FIG. 3, the hook 60 comprises a hook end 69 integrally extended from a main body (not labeled) thereof. A rearward sloped guiding portion 63 is bent from upper edge of the main body. A horizontal tab 64 is formed below the guiding portion 63. A vertical tab 62 is formed from a rear edge of the main body generally below the horizontal tab 64. A through hole 66 is defined in the main body, corresponding to the protrusion 26 of the bracket 10. A hole 68 is defined in the main body below the vertical tab 62, corresponding to the convex 28 of the bracket 10.

Figure 2:
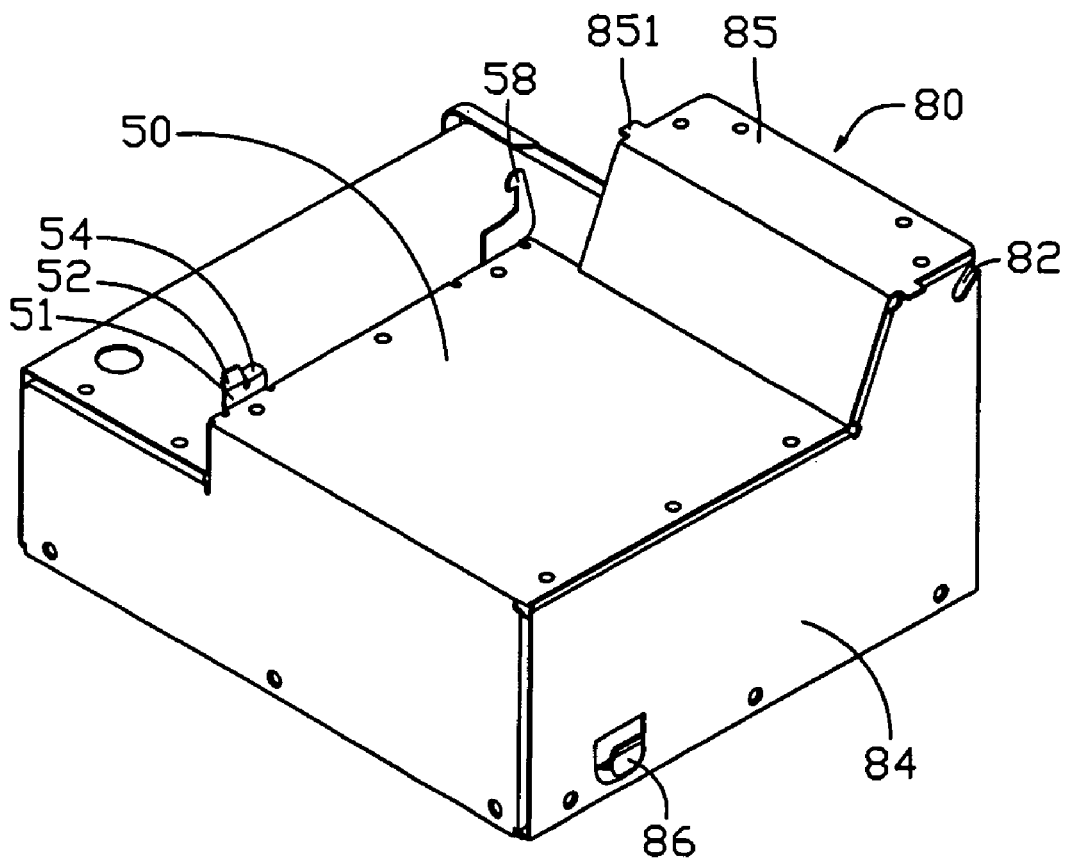
FIG. 2 is an enlarged view of the power supply shown in FIG. 1, but viewed from another aspect.

Referring back to FIGS. 1 and 2, the power supply 80 comprises a first surface 50, a second surface 83, a third surface 84 opposite to the second surface 83, and a fourth surface 85 connecting between the second and third surfaces 83, 84. The fourth surface 85 is generally parallel to the first surface 50. The first and third surfaces 50, 84 share a common edge. A stopper member 51 is formed from a front end of an edge of the first surface 50 farmost from the third surface 84, corresponding to the flange 20 of the bracket 10, and a retention member 58 as a forcing member is slantingly outwardly formed from a rear end of the edge, corresponding to the hook 60. The retention member 58 comprises a hook-shaped end portion. The stopper member 51 comprises a first tab 52, and a second tab 54 generally perpendicular to the first tab 52. A pair of guideways 82 is defined in the second and third surfaces 83, 84 respectively adjacent to a rear edge of the fourth surface 85, corresponding to the pivots 92 of the computer chassis 90. A pair of projections 851 is projected horizontally outwardly from opposite side edges of the fourth surface 85 respectively. The projections 851 are located adjacent to a front edge of the fourth surface 85. A catch 86 is formed on the third surface 84, corresponding to the groove 94 of the computer chassis 90.

In assembly of the mounting mechanism, the power supply 80 is attached to the computer chassis 90 with pivots 92 slidably and pivotally received in corresponding guideways 82 of the power supply 80. A screw 70 is engaged in the protrusion 26 to attach the hook 60 to the bracket 10.

Figure 4:
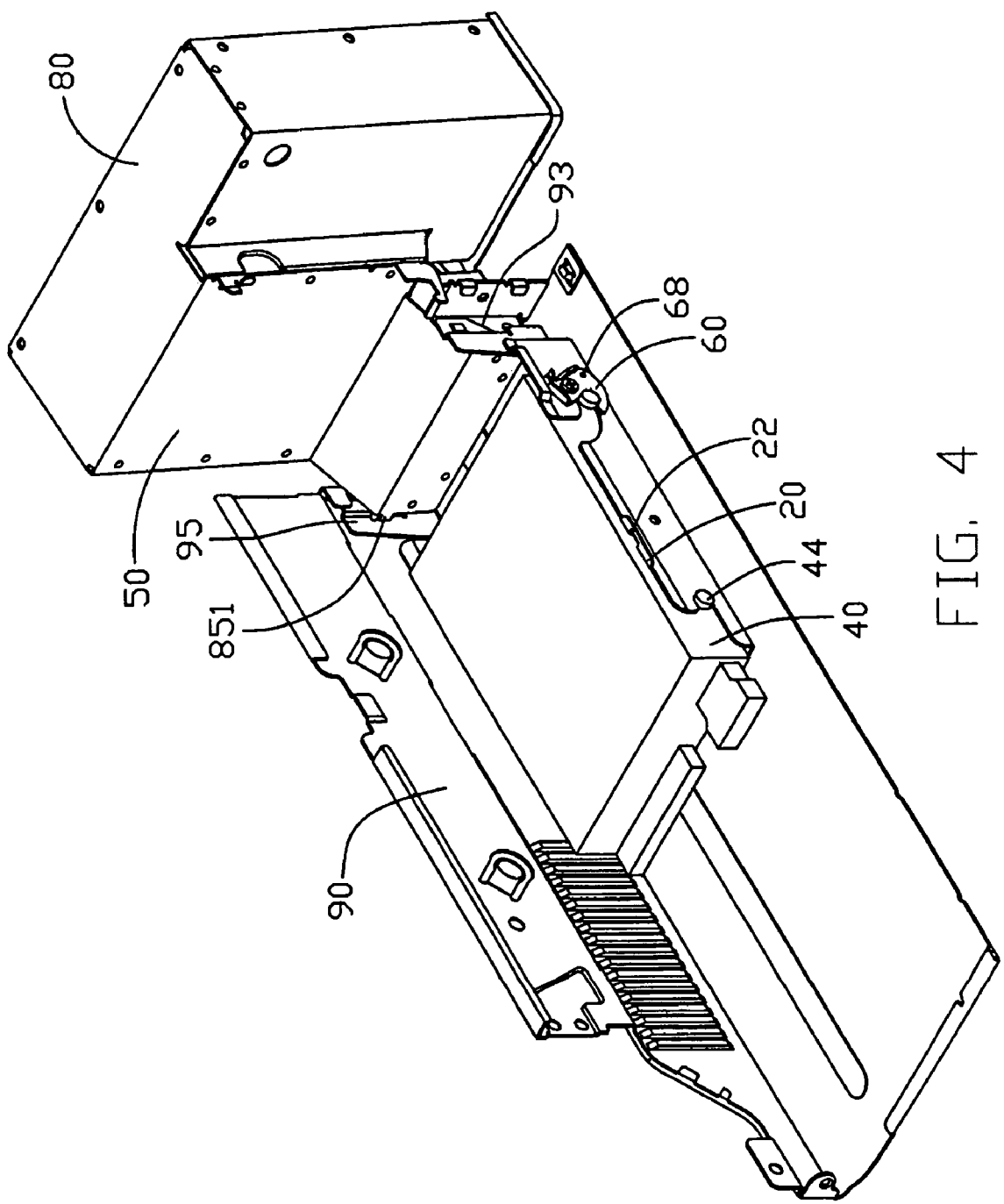
FIG. 4 is an assembled view of FIG. 1, showing the storage device partly attached to the bracket, but viewed from another aspect.

FIG. 4 shows the storage device 40 is positioned in the bracket 10, with sliding members 44 of the storage device 40 received in corresponding slideways 14, 16 of the bracket 10. The hook 60 is slantingly positioned relative to the bracket 10, with the convex 28 of the bracket 10 snappingly engaged in the hole 68 of the hook 60. The hook end 69 is generally located below one rear sliding member 44 received in the slideway 16. The power supply 80 is suspended outside the computer chassis 90. The pivots 92 of the bent plates 93, 95 are received in corresponding guideways 82 of the power supply 80, and the projections 851 engages the bent plates 93, 95 respectively.

Figure 5:
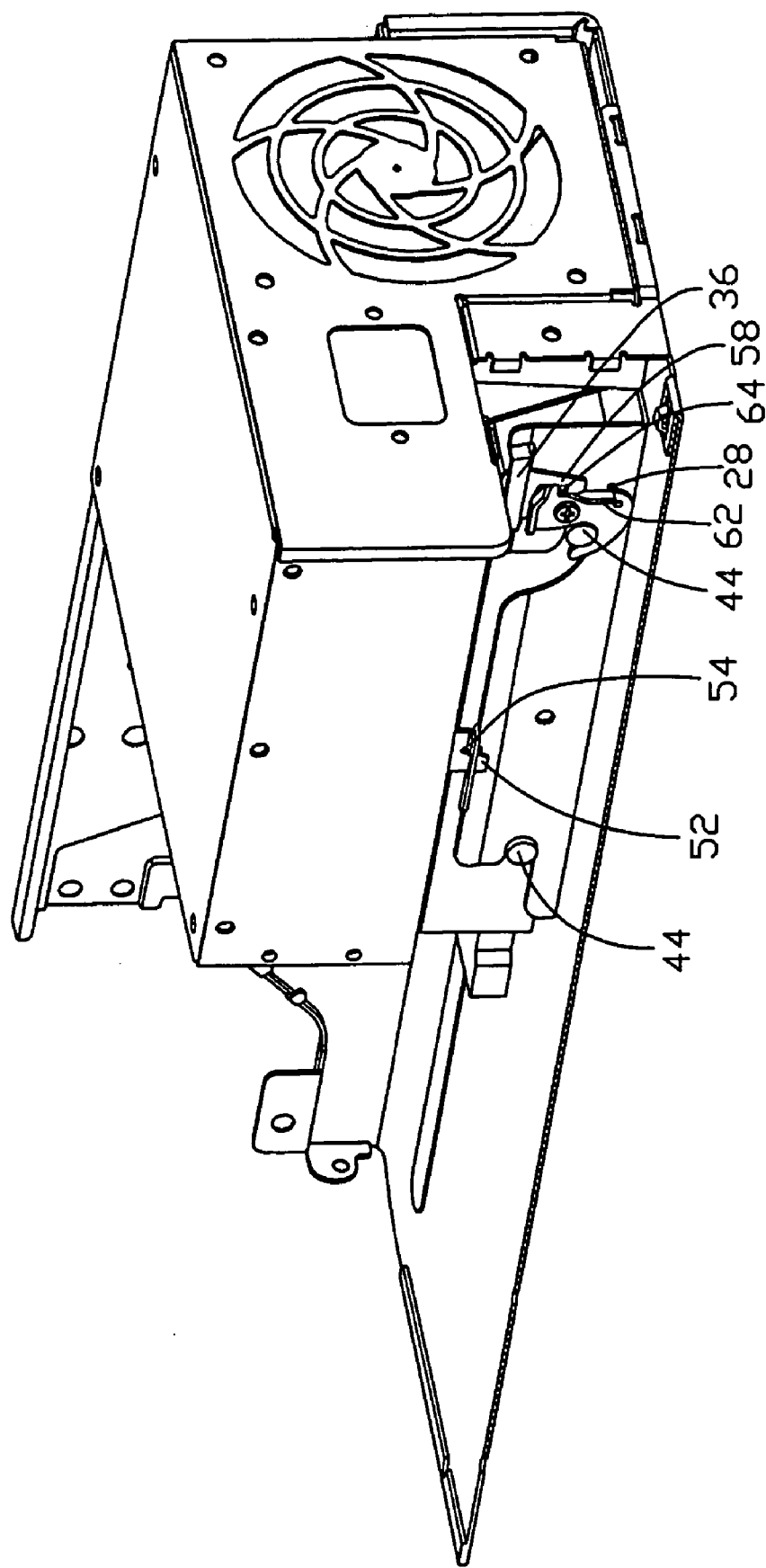
FIG. 5 is an assembled view of FIG. 1, showing the storage device fully attached to the bracket.

To secure the storage device 40 in the bracket 10, the power supply 80 is rotated inward the compute chassis 90. During the rotation of the power supply 80, the retention member 58 is extended through the opening 38 of the bracket 10 to urge the guiding portion 63 of the hook 60. The convex 28 of the bracket 10 is disengaged from the hole 68 of the hook 60. The hook 60 is thus rotated toward said rear sliding member 44 until the hook end 69 clasps said rear sliding member 44. A distal end of the retention member 58 is located below the horizontal tab 64, and engages the vertical tab 62 to prevent reverse rotation of the hook 60. The first tab 52 of the power supply 80 is extended through the slot 22 of the flange 20 of the bracket 10, and the second tab 54 engages the flange 20 to prevent further rotation of the power supply 80. The catch 86 of the power supply 80 engages the groove 94 of the second wall 96 of the computer chassis 90. FIG. 5 shows the storage device 40 is fully attached to the bracket 10.

To detach the storage device 40 from the bracket 10, the power supply 80 is rotated outwardly. The distal end of the retention member 58 of the power supply 80 engages the horizontal tab 64 to pull the hook 60 rearward. The hook 60 is rotated to an original position (shown in FIG. 4) until the convex 28 of the bracket 10 snappingly engages in the hole 68 of the hook 60. The hook end 69 disengages said rear sliding member 44 of the storage device 40. The storage device 40 is thus ready to be detached from the bracket 10.

Figure 6:
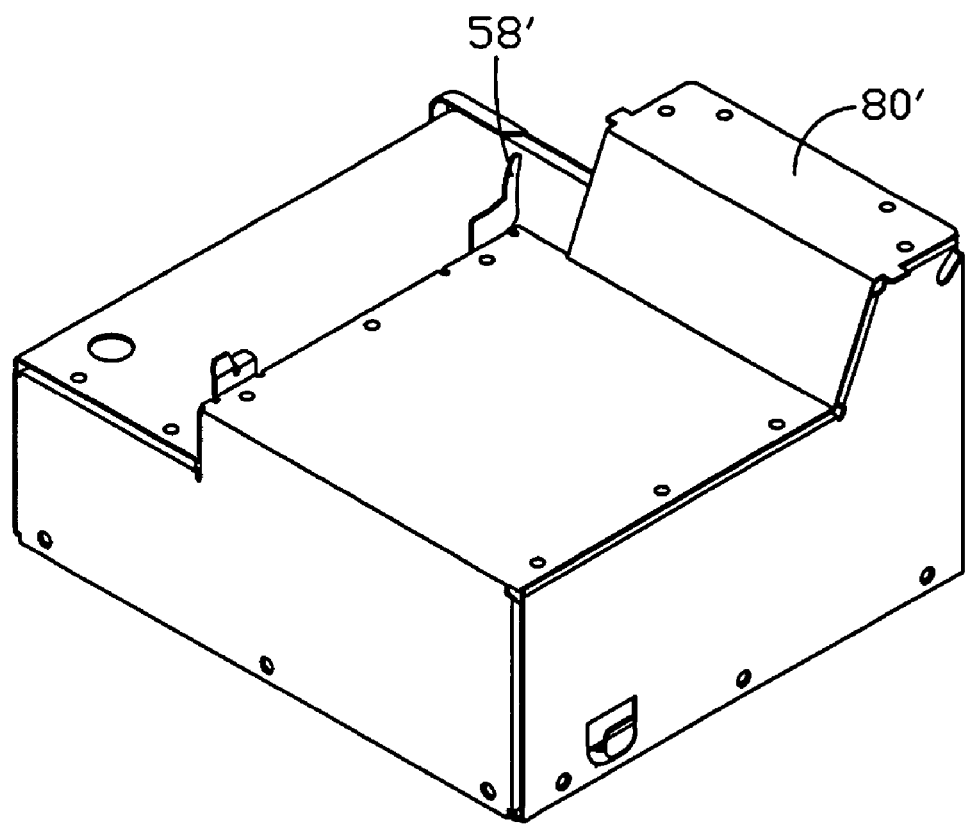
FIG. 6 is an enlarged view of an alternative power supply of an alternative embodiment.

FIGS. 6 to 9 show an alternative embodiment of the present invention. A power supply 80' is shown in FIG. 6. The power supply 80' comprises a retention member 58' from which a hook-shaped end portion of the retention member 58 shown in FIG. 3 is removed.

Figure 7:
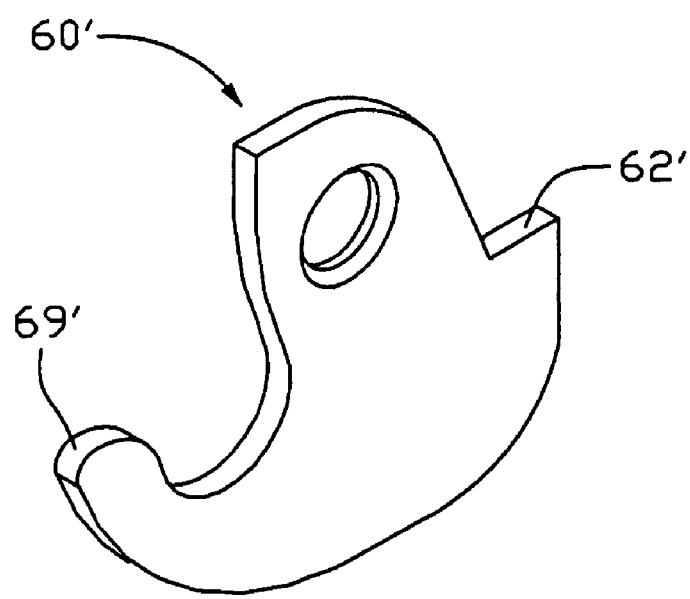
FIG. 7 is an enlarged view of an alternative hook of the alternative embodiment.

Referring to FIG. 7, a hook 60' comprises an integrate planar plate. A shoulder portion 62' is formed on the hook 60', corresponding to the retention member 58' of the power supply 80'.

Figure 8:
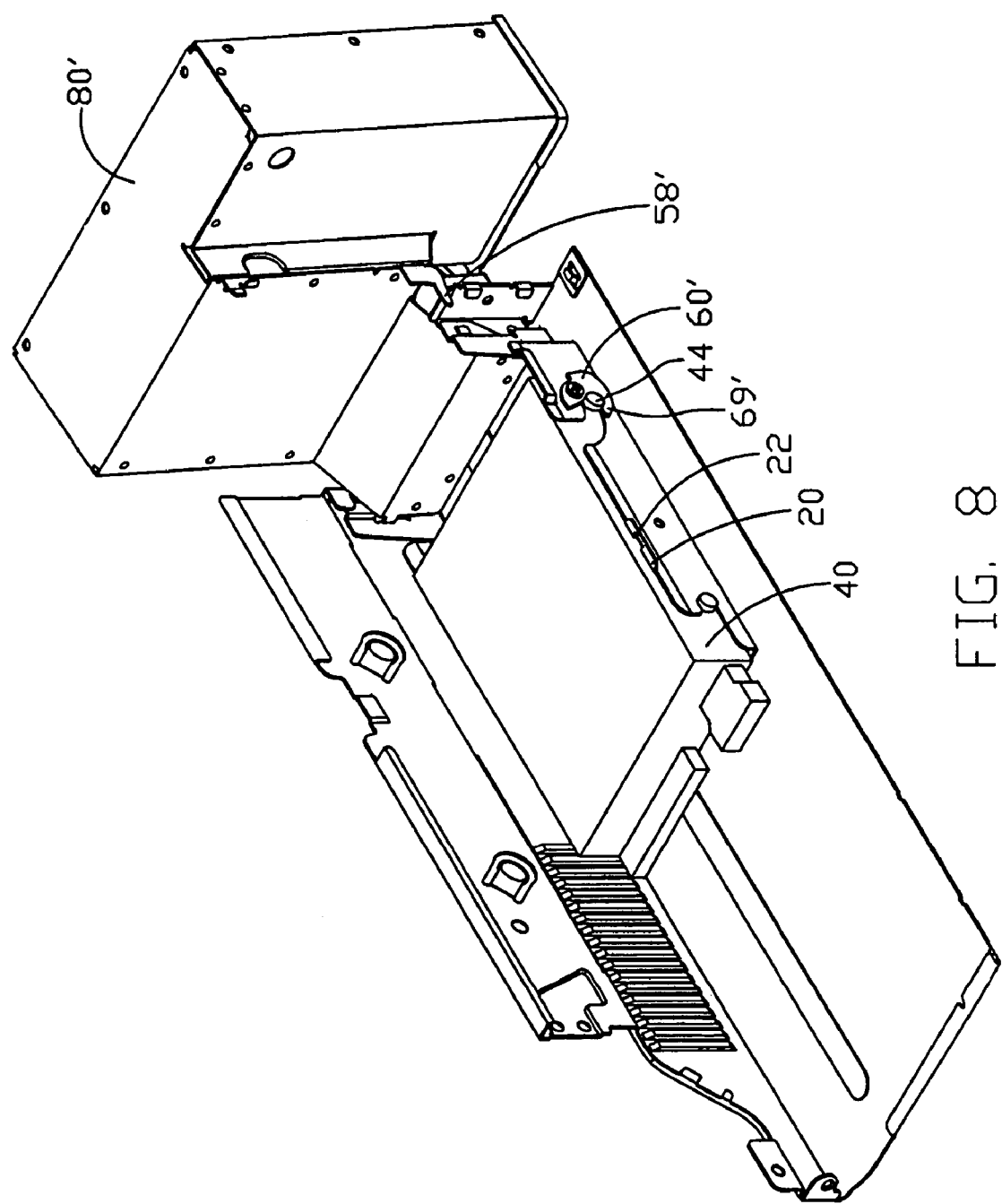
FIG. 8 is an assembled view of the alternative embodiment, showing the storage device partly attached to the bracket.

FIG. 8 shows the storage device 40 is received in the bracket 10. The hook 60' is suspended on the bracket 10 with a hook end 69' generally located below said rear sliding member 44. The hook 60' defines a center of gravity, and the hook 60' is inclined to stay at a position shown in FIG. 8 because of the gravity.

Figure 9:
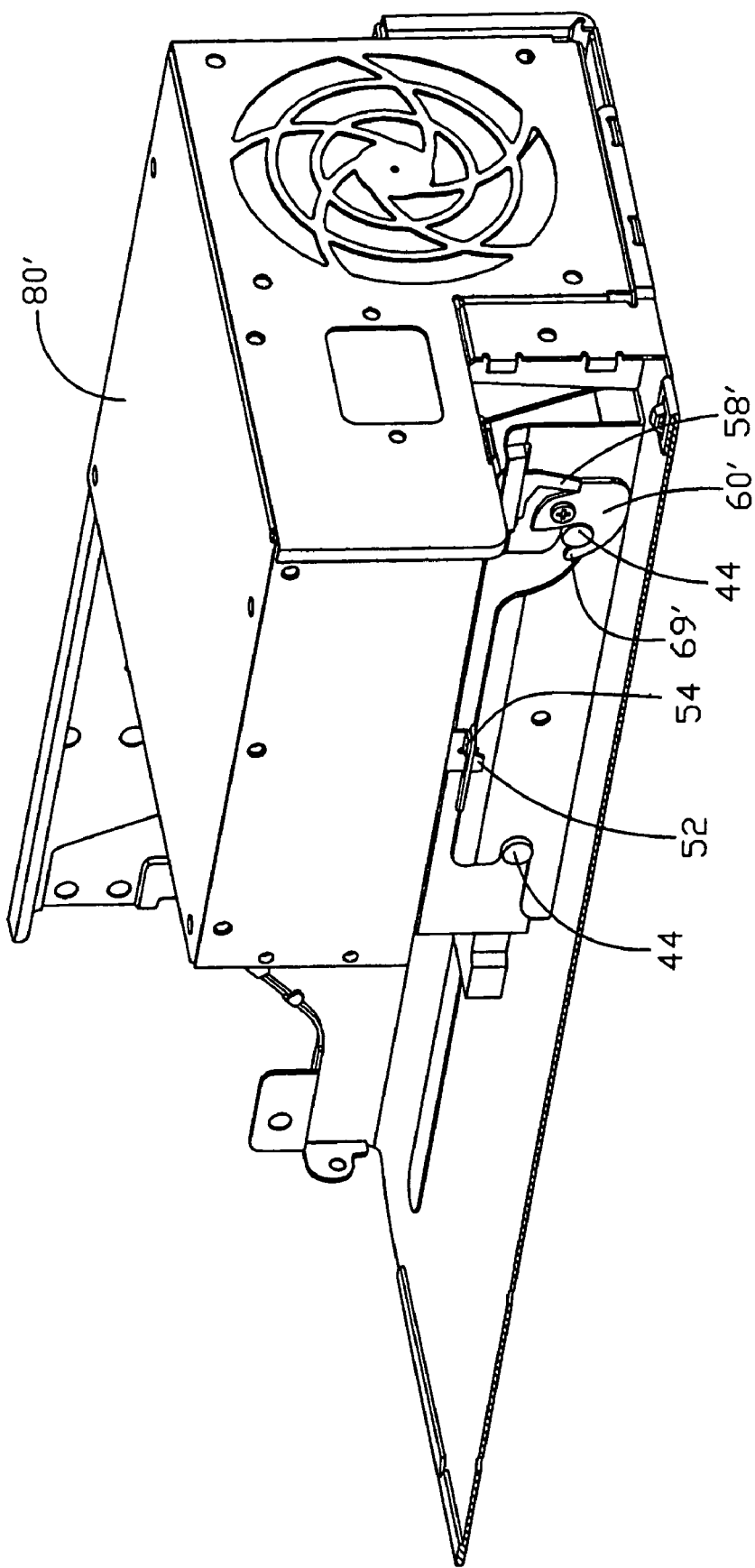
FIG. 9 is an assembled view of the alternative embodiment, showing the storage device fully attached to the bracket.

The power supply 80' is rotated inward the computer chassis 90, and the retention member 58' of the power supply 80' drives the shoulder portion 62' of the hook 60' to rotate the hook 60' toward said rear sliding member 44 until the hook end 69' clasps said rear sliding member 44. FIG. 9 shows the storage device 40 is secured in the bracket 10. To detach the storage device 40, the power supply 80' is rotated outwardly to disengage the retention member 58' from the hook 60'. The hook 60' is rotated to the position in FIG. 8 because of the gravity, and the hook end 69' disengages said rear sliding member 44. The storage device 40 is thus ready to be detached from the bracket 10.

While the present invention has been illustrated by the description of the preferred embodiments thereof, and while the preferred embodiments have been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting mechanism for a storage device having at least one sliding member, comprising:
   a bracket for receiving the storage device therein, the bracket comprising a sidewall defining at least one slideway for receiving said sliding member of the storage device;
   a hook pivotally attached to the sidewall of the bracket, the hook pivotable between a first position of releasing said sliding member of the storage device and a second position of clasping said sliding member of the storage device; and
   a retention member releasably engaging the hook to prevent the hook from pivoting out of the second position thereof toward the first position thereof for securely clasping said sliding member of the storage device.

2. The mounting mechanism as claimed in claim 1, wherein the hook comprises a horizontal tab, and the retention member comprises a distal hook-shaped end capable of pulling the horizontal tab to disengage the hook.

3. The mounting mechanism as claimed in claim 1, wherein the hook defines a center of gravity naturally inclined to unclasp the hook from said sliding member of the storage device.

4. The mounting mechanism as claimed in claim 2, wherein a vertical tab is formed on the hook generally below the horizontal tab, and the end of the retention member is capable of engaging the vertical tab.

5. The mounting mechanism as claimed in claim 3, wherein the hook comprises a shoulder portion, and the retention member engages the shoulder portion to prevent the hook from unclasping said sliding member of the storage device.

6. The mounting mechanism as claimed in claim 4, wherein a convex is formed on the sidewall of the bracket, and a hole is defined in the hook corresponding to the convex of the bracket to releasably hold the hook in the first position thereof.

7. A mounting mechanism for a storage device having at least one sliding member, comprising:
 a computer chassis;
 a bracket defining at least one slideway in a sidewall thereof for receiving said sliding member of the storage device;
 an internal device rotatably attached in the chassis; and
 a hook pivotally attached to the sidewall of the bracket, the hook adapted for retaining said sliding member of the storage device in said slideway of the bracket;
 wherein the internal device is rotated to urge the hook to clasp or release the sliding member of the storage device.

8. The mounting mechanism as claimed in claim 7, wherein said slideway is arcuate.

9. The mounting mechanism as claimed in claim 7, wherein a flange is bent from the sidewall of the bracket, a slot is defined in the flange, and a first tab is formed on the internal device to engage the slot of the flange.

10. The mounting mechanism as claimed in claim 7, wherein a retention member is formed on the internal device to engage the hook.

11. The mounting mechanism as claimed in claim 9, wherein a second tab is formed on the internal device to be supported on the flange.

12. The mounting mechanism as claimed in claim 10, wherein the hook comprises a horizontal tab, and the retention member comprises a distal hook-shaped end capable of pulling the horizontal tab to disengage the hook.

13. The mounting mechanism as claimed in claim 10, wherein the hook defines a center of gravity naturally inclined to disengage the hook from said sliding member of the storage device.

14. The mounting mechanism as claimed in claim 11, wherein a pair of bent plates is formed on the computer chassis, a pair of pivots is formed on the bent plates respectively, and the internal device is rotatable around the pivots.

15. The mounting mechanism as claimed in claim 12, wherein a vertical tab is formed on the hook generally below the horizontal tab, and the end of the retention member is capable of engaging the vertical tab.

16. The mounting mechanism as claimed in claim 13, wherein the hook comprises a shoulder portion, and the retention member engages the shoulder portion to prevent the hook from disengaging said sliding member of the storage device.

17. The mounting mechanism as claimed in claim 14, wherein the internal device is a power supply.

18. A mounting mechanism for securing a storage device in a computer chassis having another device installed next to said storage device, comprising:
 a bracket defined in said computer chassis and adapted to slidably receive said storage device;
 a securing member attached to said bracket and being movable between a first position of loosely contacting with said storage device in said bracket, and a second position of securely retaining said storage device in said bracket; and
 a forcing member movable with said another device and reachable to said securing member in case of final settlement of said another device in said computer chassis so as to move said securing member from said first position thereof to said second position thereof.

19. The mounting mechanism as described in claim 18, wherein said forcing member is capable to move said securing member from said second position thereof to said first position thereof in case of removal of said another device from said final settlement position.

20. The mounting mechanism as described in claim 18, wherein said securing member is hook-shaped and has a hole thereon contributory to releasably hold said securing member in said first position thereof.

\* \* \* \* \*